US010642670B2

(12) United States Patent
Mozhaev

(10) Patent No.: US 10,642,670 B2
(45) Date of Patent: May 5, 2020

(54) METHODS AND SYSTEMS FOR SELECTING POTENTIALLY ERRONEOUSLY RANKED DOCUMENTS BY A MACHINE LEARNING ALGORITHM

(71) Applicant: YANDEX EUROPE AG, Lucerne (CH)

(72) Inventor: Alexey Vladislavovich Mozhaev, Moscow (RU)

(73) Assignee: YANDEX EUROPE AG, Lucerne (CH)

( * ) Notice: Subject to any disclaimer, the term of this patent is extended or adjusted under 35 U.S.C. 154(b) by 342 days.

(21) Appl. No.: 15/861,993

(22) Filed: Jan. 4, 2018

(65) Prior Publication Data

US 2018/0285176 A1 Oct. 4, 2018

(30) Foreign Application Priority Data

Apr. 4, 2017 (RU) .................................. 2017111249

(51) Int. Cl.
| | | |
|---|---|---|
| *G06F 16/30* | (2019.01) | |
| *G06F 11/00* | (2006.01) | |
| *G06N 20/00* | (2019.01) | |
| *G06F 16/951* | (2019.01) | |
| *G06F 16/2457* | (2019.01) | |

(52) U.S. Cl.
CPC ...... *G06F 11/006* (2013.01); *G06F 16/24578* (2019.01); *G06F 16/951* (2019.01); *G06N 20/00* (2019.01); *G06F 2201/80* (2013.01)

(58) Field of Classification Search
CPC .......................... G06F 16/24578; G06F 16/951
See application file for complete search history.

(56) References Cited

U.S. PATENT DOCUMENTS

| | | |
|---|---|---|
| 7,844,567 B2 | 11/2010 | He et al. |
| 8,713,023 B1 | 4/2014 | Cormack et al. |
| 9,501,575 B2 | 11/2016 | Serdyukov et al. |

(Continued)

FOREIGN PATENT DOCUMENTS

RU      2608886 C2     1/2017

OTHER PUBLICATIONS

Search Report with regard to the counterpart RU patent Application No. 2017111249 completed Apr. 3, 2018.

*Primary Examiner* — Sana A Al-Hashemi
(74) *Attorney, Agent, or Firm* — BCF LLP

(57) ABSTRACT

A method and a system for selecting a potentially erroneously ranked document in a set of search results responsive to a query comprising receiving the set of search results from the search engine server, each document of the set of search results having a relevance score and a feature vector generated by an MLA, computing for each possible pair of documents a first parameter indicative of a level of difference in the relevance scores of the documents of the pair of documents and a second parameter indicative of a level of difference in the feature vectors of the documents of the pair of documents, computing a verification score based on first parameter and the second parameter, the verification score indicative of a level of misalignment between the relevance scores and the feature vectors, selecting and marking the pair of documents associated with an extreme verification score for verification.

20 Claims, 5 Drawing Sheets

(56) References Cited

U.S. PATENT DOCUMENTS

| | | | |
|---|---|---|---|
| 10,559,386 B1* | 2/2020 | Neumann | G06N 20/20 |
| 2003/0130993 A1* | 7/2003 | Mendelevitch | G06F 16/353 |
| 2012/0109860 A1 | 5/2012 | Xu et al. | |
| 2014/0358931 A1* | 12/2014 | Garera | G06F 16/258 |
| | | | 707/740 |
| 2016/0155063 A1* | 6/2016 | Rich | G06N 5/022 |
| | | | 706/12 |

* cited by examiner

METHODS AND SYSTEMS FOR SELECTING POTENTIALLY ERRONEOUSLY RANKED DOCUMENTS BY A MACHINE LEARNING ALGORITHM

CROSS-REFERENCE

The present application claims priority to Russian Patent Application No. 2017111249, entitled "Methods And Systems For Selecting Potentially Erroneously Ranked Documents By A Machine Learning Algorithm," filed Apr. 4, 2017, the entirety of which is incorporated herein by reference.

FIELD

The present technology relates to machine-learning algorithms and more specifically to methods and systems for selecting potentially erroneously ranked documents by a machine learning algorithm.

BACKGROUND

Improvements in computer hardware and technology coupled with the multiplication of connected mobile electronic devices has amplified interest in developing artificial intelligence and solutions for task automatization, outcome prediction, information classification and learning from experience, resulting in the field of machine learning. Machine learning, closely related to data mining, computational statistics and optimization, explores the study and construction of algorithms that can learn from and make predictions based on data.

The field of machine learning has evolved extensively in the last decade, giving rise to self-driving cars, speech recognition, image recognition, effective web search, personalization, and understanding of the human genome, among others.

Machine learning algorithms (MLA) may generally be divided into broad categories such as supervised learning, unsupervised learning and reinforcement learning. Supervised learning consists in presenting a machine learning algorithm with training data consisting of inputs and outputs labelled by assessors, where the objective is to train the machine learning algorithm such that it learns a general rule for mapping inputs to outputs. Unsupervised learning consists in presenting the machine learning algorithm with unlabeled data, where the objective is for the machine learning algorithm to find a structure or hidden patterns in the data. Reinforcement learning consists in having an algorithm evolving in a dynamic environment without providing the algorithm with labeled data or corrections.

Recent advances in the field have also produced active learning, a form of semi-supervised learning, born from situations where unlabeled data is abundant, but where labeling data can be expensive. In such situations, learning algorithms may query assessors for labels when needed, therefore iteratively improving their models while possibly requiring less data.

Learning to rank (LTR) or machine learned ranking (MLR) is the application of machine learning in the construction of ranking models for information retrieval, natural language processing and data mining. Generally, a system may maintain a collection of documents, where a ranking model may rank documents responsive to a query, and return the most relevant documents. The ranking model may have been previously trained on sample documents. However, the sheer number of documents available on the Internet combined with its continuous growth makes labeling not only difficult, but requires a lot of computational and monetary resources, as it is often performed by human assessors.

U.S. Pat. No. 8,713,023 issued Apr. 29, 2014 to Cormack et al. teaches systems and methods for classifying electronic information or documents into a number of classes and subclasses through an active learning algorithm. Such document classification systems are easily scalable for large document collections, require less manpower and can be employed on a single computer, thus requiring fewer resources. Furthermore, the classification systems and methods described can be used for any pattern recognition or classification effort in a wide variety of fields, including electronic discovery in legal proceedings.

U.S. Pat. No. 7,844,567 issued Nov. 30, 2010 to He et al. teaches a system and method for selecting a training sample from a sample set. The method comprises determining proximities between all data samples in a set of the data samples, forming edges between the data samples as a function of the proximities, computing weights for the edges as a function of the proximities, selecting a plurality of the data samples as a function of the weights to form a subset of the data samples, and storing the subset of the data samples.

U.S. Patent Publication No. 2012/0109860 A1 by Xu et al. teaches that training data is used by learning-to-rank algorithms for formulating ranking algorithms. The training data can be initially provided by human judges, and then modeled in light of user click-through data to detect probable ranking errors. The probable ranking errors are provided to the original human judges, who can refine the training data in light of this information.

For the foregoing reasons, there is a need for methods and systems for selecting potentially erroneously ranked documents by a machine learning algorithm.

SUMMARY

Embodiments of the present technology have been developed based on developers' appreciation of at least one technical problem associated with the prior art solutions.

Embodiments of the present technology have been developed based on developers' appreciation that while different methods have been developed in machine learned ranking, it is often difficult to detect errors in ranking.

The present technology arises from an observation made by the developer(s) that detecting errors in ranking may not only allow improving the accuracy of the machine learning algorithms used for ranking, but may also allow improving the quality of the training data by using the erroneously ranked documents, therefore requiring less training data, and resulting in an economy of computational resources, money and time.

Therefore, developer(s) have devised method and systems for selecting potentially erroneously ranked documents by a machine learning algorithm.

In accordance with a first broad aspect of the present technology, there is provided a method for selecting a potentially erroneously ranked document in a set of search results, the set of search results having been generated by a search engine server executing a machine learning algorithm (MLA) responsive to a query, the method executable by an electronic device, the electronic device connected to the search engine server, the method comprising: receiving, by the electronic device, the set of search results from the search engine server, each document of the set of search results having a relevance score generated by the MLA and a feature vector generated by the MLA, the relevance score having been generated at least in part based on the feature vector, computing, by the electronic device, for each possible pair of documents of the set of search results, the pair of documents comprising a first document and a second document: a first parameter obtained by a first binary operation on the relevance scores of the first document and the second document, the first parameter indicative of a level of difference in the relevance scores of the first document and the second document, and a second parameter obtained by a second binary operation on the feature vectors of the first document and the second document, the second parameter indicative of a level of difference in the feature vectors of the first document and the second document, computing, by the electronic device, a verification score for each possible pair of documents of the set of search results, the verification score being based on first parameter and the second parameter, the verification score indicative of a level of misalignment between the relevance scores of the first document and the second document and the feature vectors of the first document and the second document of the pair of documents, selecting, by the electronic device, at least one pair of documents associated with an extreme verification score, the extreme verification score indicative of a high level of misalignment between the relevance scores of the first document and the second document and the feature vectors of the first document and the second document of the pair of documents, the high level of misalignment indicative of a possibly erroneously ranked document in the pair of documents, and marking, by the electronic device, the at least one selected pair of documents associated with the extreme verification score for verification by the search engine server.

In some implementations, the extreme verification score is further indicative of an inability of the MLA of the search engine server to properly distinguish the first document and the second document of the pair of documents.

In some implementations, the verification score increases for pairs of document having a high first parameter and a low second parameter, and wherein the verification score decreases for pairs of documents having a low first parameter and a high second parameter.

In some implementations, the high first parameter is indicative of a high level of difference in the relevance scores of the first document and the second document, and wherein the low first parameter is indicative of a low level of difference in the relevance scores of the first document and the second document.

In some implementations, the high second parameter is indicative of a high level of difference in the feature vectors of the first document and the second document, and wherein the low second parameter is indicative of a low level of difference in the feature vectors of the first document and the second document.

In some implementations, each document of the set of search results has a position in a search engine results page (SERP), the position having been determined at least in part based on the relevance score, and wherein the verification score is further based on a third parameter, the third parameter being based on the positions in the SERP of the first document and the second document of the pair of documents.

In some implementations, the first binary operation is a subtraction and the second binary operation is a subtraction.

In some implementations, the third parameter is a lowest position between the position of the first document of the pair and the second document of the pair.

In some implementations, the extreme verification score is a lowest verification score.

In some implementations, the selecting the at least one pair associated with the lowest verification score comprises: ranking the verification scores in a descending order, and selecting a subset of verification scores, each verification score of the subset of verification scores being under a predetermined threshold, the predetermined threshold indicative of an erroneously ranked document.

In some implementations, the first parameter is weighted by a first coefficient, the second parameter is weighted by a second coefficient and the third parameter is weighted by a third coefficient, the first coefficient, the second coefficient and the third coefficient allowing to reflect a degree of influence of the first parameter, the second parameter and the third parameter in the verification score for selecting the at least one possibly erroneously ranked document.

In some implementations, the first coefficient, the second coefficient and the third coefficient are determined heuristically.

In some implementations, the computing for each pair of adjacent document is performed for a subset of the set of search results.

In some implementations, the method further comprises transmitting the at least one pair of documents to the search engine server, and repeating the steps of: receiving the set of search results, computing the first parameter, the second parameter and the third parameter, computing the verification score, the selecting the at least one pair associated with the lowest verification score and the marking the at least one pair after a predetermined period of time.

In some implementations, the verification score is computed based on:

$$P_q(d_1, d_2) = \alpha^{min(Pos(d_1), Pos(d_2))} \cdot \frac{|Relev(d_1) - Relev(d_2)|^\beta}{\|Feats(d_1) - Feats(d_2)\|_2^\gamma}$$

where
$P_q(d_1, d_2)$ is the verification score of the pair of documents,
$d_1$ is the first document of the pair of documents,
$d_2$ is the second document of the pair of documents,
$Relev(d_1) - Relev(d_2)$ is the first parameter,
$Feats(d_1) - Feats(d_2)$ is the second parameter,
$min(Pos(d_1), Pos(d_2))$ is the third parameter,
$\beta$ is the first coefficient,
$\gamma$ is the second coefficient, and
$\alpha$ is the third coefficient.

In accordance with a second broad aspect of the present technology, there is provided a system for selecting a potentially erroneously ranked document in a set of search results, the set of search results having been generated by a search engine server executing a machine learning algorithm (MLA) responsive to a query, the system connected to the search engine server, the system comprising: a processor, a non-transitory computer-readable medium comprising instructions, the processor, upon executing the instructions, being configured to cause: receiving the set of search results from the search engine server, each document of the set of search results having a relevance score generated by the MLA and a feature vector generated by the MLA, the relevance score having been generated at least in part based on the feature vector, computing for each possible pair of documents of the set of search results, the pair of documents comprising a first document and a second document: a first parameter obtained by a first binary operation on the relevance scores of the first document and the second document, the first parameter indicative of a level of difference in the relevance scores of the first document and the second document, and a second parameter obtained by a second binary operation on the feature vectors of the first document and the second document, the second parameter indicative of a level of difference in the feature vectors of the first document and the second document, computing a verification score for each possible pair of documents of the set of search results, the verification score being based on first parameter and the second parameter, the verification score indicative of a level of misalignment between the relevance scores of the first document and the second document and the feature vectors of the first document and the second document of the pair of documents, selecting at least one pair of documents associated with an extreme verification score, the extreme verification score indicative of a high level of misalignment between the relevance scores of the first document and the second document and the feature vectors of the first document and the second document of the pair of documents, the high level of misalignment indicative of a possibly erroneously ranked document in the pair of documents, and marking the at least one selected pair of documents associated with the extreme verification score for verification by the search engine server.

In some implementations, the extreme verification score is further indicative of an inability of the MLA of the search engine server to distinguish the first document and the second document of the pair of documents.

In some implementations, the verification score increases for pairs of document having a high first parameter and a low second parameter, and wherein the verification score decreases for pairs of documents having a low first parameter and a high second parameter.

In some implementations, the high first parameter is indicative of a high level of difference in the relevance scores of the first document and the second document, and wherein the low first parameter is indicative of a low level of difference in the relevance scores of the first document and the second document.

In some implementations, the high second parameter is indicative of a high level of difference in the feature vectors of the first document and the second document, and wherein the low second parameter is indicative of a low level of difference in the feature vectors of the first document and the second document.

In some implementations, each document of the set of search results has a position in a search engine results page (SERP), the position having been determined at least in part based on the relevance score, and wherein the verification score is further based on a third parameter, the third parameter being based on the positions in the SERP of the first document and the second document of the pair of documents.

In some implementations, the first binary operation is a subtraction and the second binary operation is a subtraction.

In some implementations, the third parameter is a lowest position between the position of the first document of the pair and the second document of the pair.

In some implementations, the extreme verification score is a lowest verification score.

In some implementations, the selecting the at least one pair associated with the lowest verification score comprises selecting a subset of verification scores, each verification score of the subset of verification scores being under a predetermined threshold, the predetermined threshold indicative of an erroneously ranked document.

In some implementations, the first parameter is weighted by a first coefficient, the second parameter is weighted by a second coefficient and the third parameter is weighted by a third coefficient, the first coefficient, the second coefficient and the third coefficient allowing to reflect a degree of influence of the first parameter, the second parameter and the third parameter in the verification score for selecting the at least one possibly erroneously ranked document.

In some implementations, the first coefficient, the second coefficient and the third coefficient are determined heuristically.

In some implementations, the computing for each pair of adjacent document is performed for a subset of the set of search results.

In some implementations, the method further comprises transmitting the at least one pair of documents to the search engine server, and repeating the steps of: receiving the set of search results, computing the first parameter, the second parameter and the third parameter, computing the verification score, the selecting the at least one pair associated with the lowest verification score and the marking the at least one pair after a predetermined period of time.

In some implementations, the verification score is computed based on:

$$P_q(d_1, d_2) = \alpha^{min(Pos(d_1), Pos(d_2))} \cdot \frac{|Relev(d_1) - Relev(d_2)|^\beta}{\|Feats(d_1) - Feats(d_2)\|_2^\gamma}$$

where
$P_q(d_1,d_2)$ is the verification score of the pair of documents,
$d_1$ is the first document of the pair of documents,
$d_2$ is the second document of the pair of documents,
$Relev(d_1)-Relev(d_2)$ is the first parameter,
$Feats(d_1)-Feats(d_2)$ is the second parameter,
$min(Pos(d_1),Pos(d_2))$ is the third parameter,
$\beta$ is the first coefficient,
$\gamma$ is the second coefficient, and
$\alpha$ is the third coefficient.

In the context of the present specification, a "server" is a computer program that is running on appropriate hardware and is capable of receiving requests (e.g. from client devices) over a network, and carrying out those requests, or causing those requests to be carried out. The hardware may be implemented as one physical computer or one physical computer system, but neither is required to be the case with respect to the present technology. In the present context, the use of the expression a "server" is not intended to mean that every task (e.g. received instructions or requests) or any particular task will have been received, carried out, or caused to be carried out, by the same server (i.e. the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "electronic device" is any computer hardware that is capable of running software appropriate to the relevant task at hand. In the context of the present specification, the term "electronic device" implies that a device can function as a server for other electronic devices and client devices, however it is not required to be the case with respect to the present technology. Thus, some (non-limiting) examples of electronic devices include personal computers (desktops, laptops, netbooks, etc.), smartphones, and tablets, as well as network equipment such as routers, switches, and gateways. It should be understood, that in the present context the fact that the device functions as an electronic device does not mean that it cannot function as a server for other electronic devices. The use of the expression "an electronic device" does not preclude multiple client devices being used in receiving/sending, carrying out or causing to be carried out any task or request, or the consequences of any task or request, or steps of any method described herein.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, etc.

In the context of the present specification, the expression "software component" is meant to include software (appropriate to a particular hardware context) that is both necessary and sufficient to achieve the specific function(s) being referenced.

In the context of the present specification, the expression "document" is to be broadly interpreted to include any machine-readable and machine-storable work product.

A document may include an e-mail, a web site, a file, a combination of files, one or more files with embedded links to other files, a news group posting, a blog, a web advertisement, etc. In the context of the Internet, a common document is a web page. Web pages often include textual information and may include embedded information (such as meta information, images, hyperlinks, etc.) and/or embedded instructions (such as Javascript, etc.). A page may correspond to a document or a portion of a document. Therefore, the words "page" and "document" may be used interchangeably in some cases. In other cases, a page may refer to a portion of a document, such as a sub-document. It may also be possible for a page to correspond to more than a single document.

In the context of the present specification, the expression "computer information storage media" (also referred to as "storage media") is intended to include media of any nature and kind whatsoever, including without limitation RAM, ROM, disks (CD-ROMs, DVDs, floppy disks, hard drivers, etc.), USB keys, solid state-drives, tape drives, etc. A plurality of components may be combined to form the computer information storage media, including two or more media components of a same type and/or two or more media components of different types.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first database" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware components, in other cases they may be different software and/or hardware components.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

These and other features, aspects and advantages of the present technology will become better understood with regard to the following description, appended claims and accompanying drawings where:

DETAILED DESCRIPTION

Figure 1:
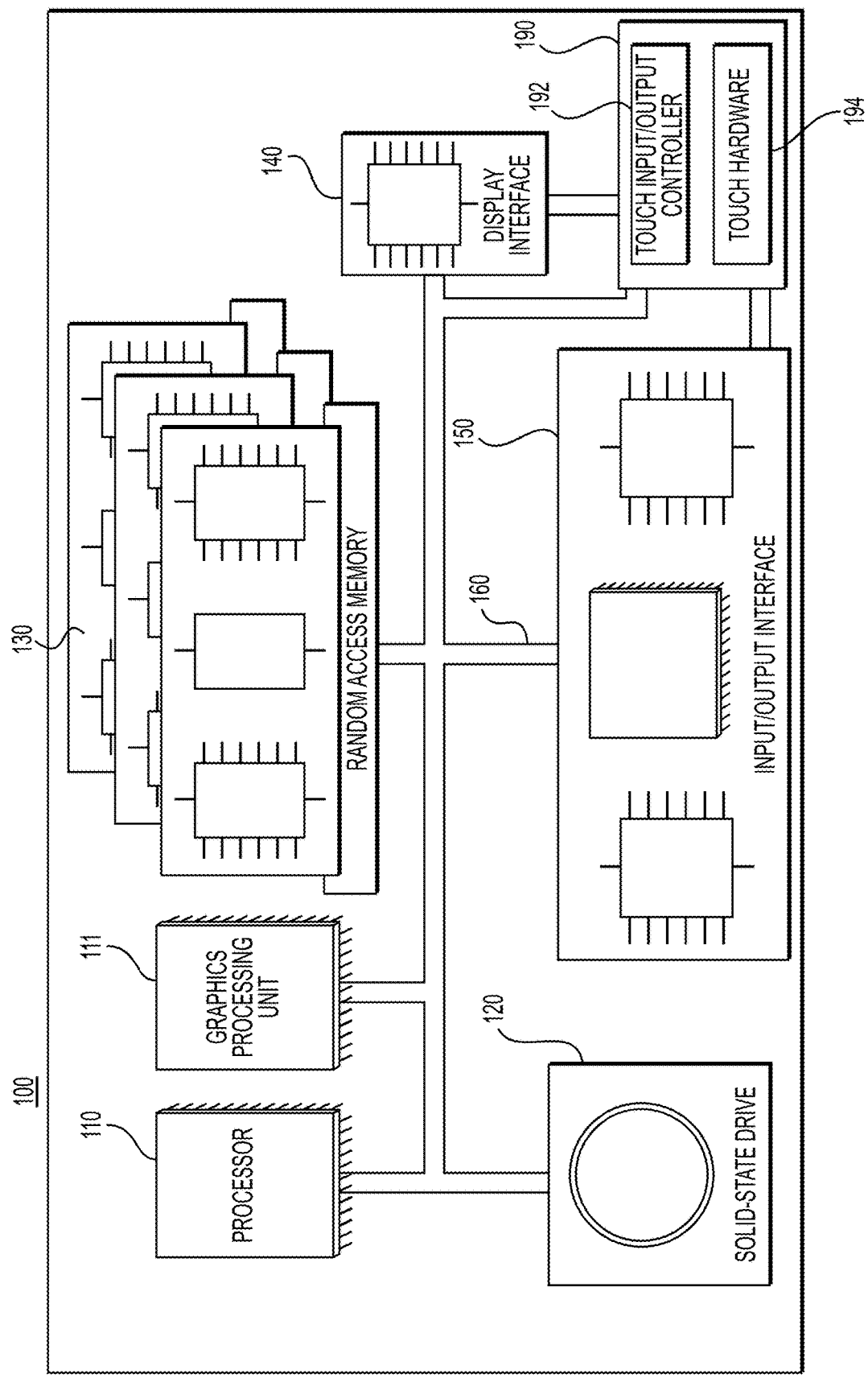
FIG. 1 is an illustration of components and features of an electronic device implemented in accordance with an embodiment of the present technology.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes which may be substantially represented in computer-readable media and so executed by a computer or processor, whether or not such computer or processor is explicitly shown.

The functions of the various elements shown in the figures, including any functional block labeled as a "processor" or a "graphics processing unit", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some embodiments of the present technology, the processor may be a general purpose processor, such as a central processing unit (CPU) or a processor dedicated to a specific purpose, such as a graphics processing unit (GPU). Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

With these fundamentals in place, we will now consider some non-limiting examples to illustrate various implementations of aspects of the present technology.

Referring to FIG. 1, there is shown an electronic device 100 suitable for use with some implementations of the present technology, the electronic device 100 comprising various hardware components including one or more single or multi-core processors collectively represented by processor 110, a graphics processing unit (GPU) 111, a solid-state drive 120, a random access memory 130, a display interface 140, and an input/output interface 150.

Communication between the various components of the electronic device 100 may be enabled by one or more internal and/or external buses 160 (e.g. a PCI bus, universal serial bus, IEEE 1394 "Firewire" bus, SCSI bus, Serial-ATA bus, etc.), to which the various hardware components are electronically coupled.

The input/output interface 150 may be coupled to a touchscreen 190 and/or to the one or more internal and/or external buses 160. The touchscreen 190 may be part of the display. In some embodiments, the touchscreen 190 is the display. The touchscreen 190 may equally be referred to as a screen 190. In the embodiments illustrated in FIG. 1, the touchscreen 190 comprises touch hardware 194 (e.g., pressure-sensitive cells embedded in a layer of a display allowing detection of a physical interaction between a user and the display) and a touch input/output controller 192 allowing communication with the display interface 140 and/or the one or more internal and/or external buses 160. In some embodiments, the input/output interface 150 may be connected to a keyboard (not shown), a mouse (not shown) or a trackpad (not shown) allowing the user to interact with the electronic device 100 in addition or in replacement of the touchscreen 190.

According to implementations of the present technology, the solid-state drive 120 stores program instructions suitable for being loaded into the random access memory 130 and executed by the processor 110 and/or the GPU 111. For example, the program instructions may be part of a library or an application.

The electronic device 100 may be a server, a desktop computer, a laptop computer, a tablet, a smartphone, a personal digital assistant or any device that may be configured to implement the present technology, as should be understood by a person skilled in the art. The electronic device 100 may execute the production phase of the present technology.

Figure 2:
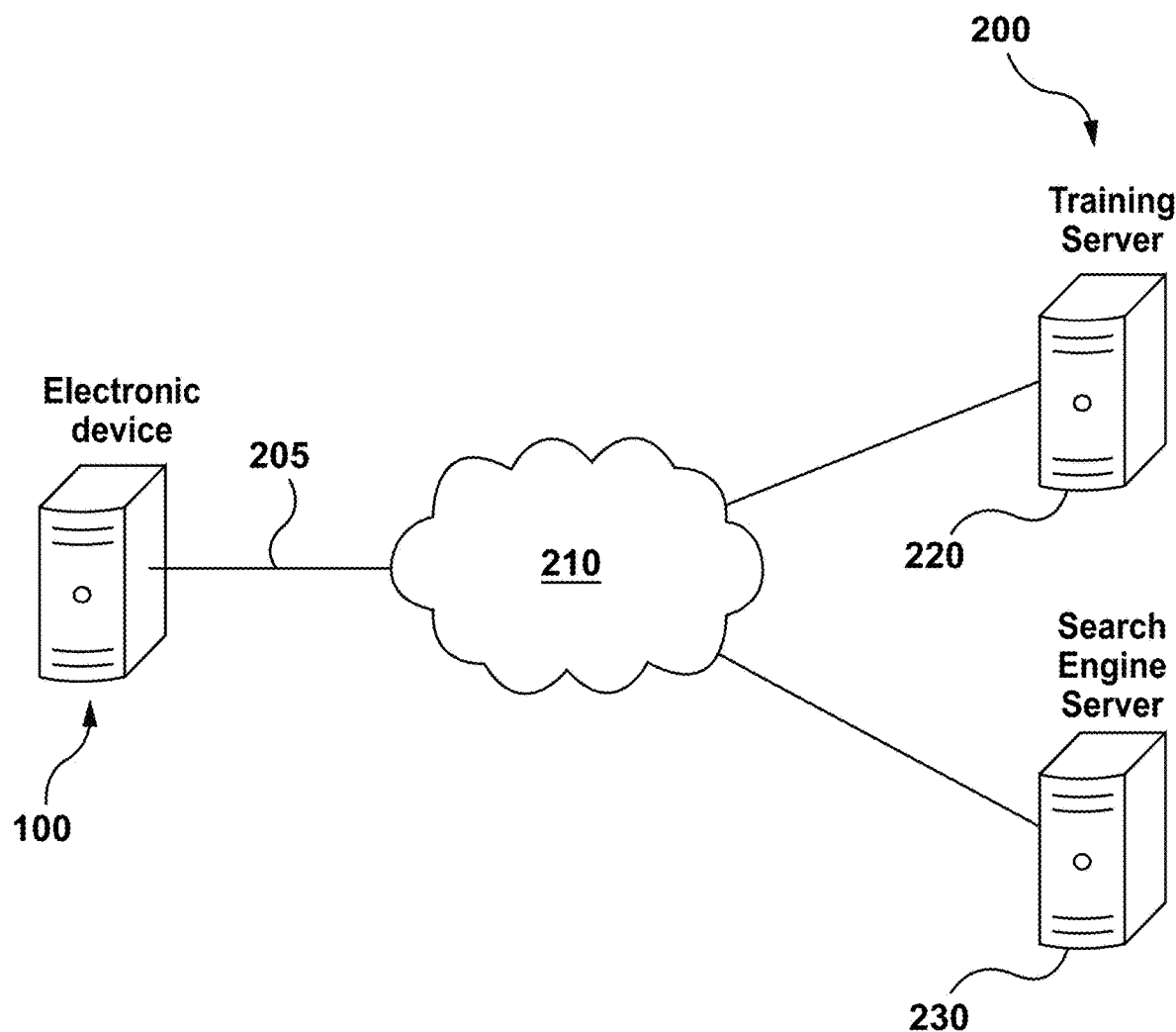
FIG. 2 is an illustration of a system that includes the electronic device of FIG. 1 implemented in accordance with an embodiment of the present technology.

Now turning to FIG. 2, the electronic device 100 is coupled to a communications network 210 via a communication link 205. In some non-limiting embodiments of the present technology, the communications network 210 can be implemented as the Internet. In other embodiments of the present technology, the communications network 210 can be implemented differently, such as any wide-area communications network, local-area communications network, a private communications network and the like.

How the communication link 205 is implemented is not particularly limited and will depend on how the electronic device 100 is implemented. Merely as an example and not as a limitation, in those embodiments of the present technology where the electronic device 100 is implemented as a wireless communication device (such as a smart-phone), the communication link 205 can be implemented as a wireless communication link (such as but not limited to, a 3G communications network link, a 4G communications network link, a Wireless Fidelity, or WiFi® for short, Bluetooth® and the like). In those examples, where the electronic device 100 is implemented as a notebook computer, the communication link 205 can be either wireless (such as the Wireless Fidelity, or WiFi® for short, Bluetooth® or the like) or wired (such as an Ethernet based connection).

It should be expressly understood that implementations for the electronic device 100, the communication link 205 and the communications network 210 are provided for illustration purposes only. As such, those skilled in the art will easily appreciate other specific implementational details for the electronic device 100, the communication link 205 and the communications network 210. As such, by no means, examples provided herein above are meant to limit the scope of the present technology.

Also coupled to the communications network is a training server 220. The training server 220 can be implemented as a conventional computer server. In an example of an embodiment of the present technology, the training server 220 can be implemented as a Dell™ PowerEdge™ Server running the Microsoft™ Windows Server™ operating system. Needless to say, the training server 220 can be implemented in any other suitable hardware and/or software and/or firmware or a combination thereof. In the depicted non-limiting embodiment of present technology, the training server 220 is a single server. In alternative non-limiting embodiments of the present technology, the functionality of the training server 220 may be distributed and may be implemented via multiple servers. In the context of the present technology, the training server 220 may implement in part the methods and system described herein. In some embodiments of the present technology, the training server 220 is under control and/or management of a search engine operator. Alternatively, the training server 220 can be under control and/or management of another service provider. The training server 220 may execute the training phase of the present technology.

Also coupled to the communications network is a search engine server 230. The search engine server 230 can be implemented as a conventional computer server. In an example of an embodiment of the present technology, the search engine server 230 can be implemented as a Dell™ PowerEdge™ Server running the Microsoft™ Windows Server™ operating system. Needless to say, search engine server 230 can be implemented in any other suitable hardware and/or software and/or firmware or a combination thereof. In the depicted non-limiting embodiment of present technology, search engine server 230 is a single server. In alternative non-limiting embodiments of the present technology, the functionality of the search engine server 230 may be distributed and may be implemented via multiple servers. In the context of the present technology, search engine server 230 may implement in part the methods and system described herein. In some embodiments of the present technology, search engine server 230 is under control and/or management of a search engine operator. Alternatively, the search engine server 230 can be under control and/or management of a service provider. The search engine server 230 may execute a machine learning algorithm to rank search results.

Figure 3:
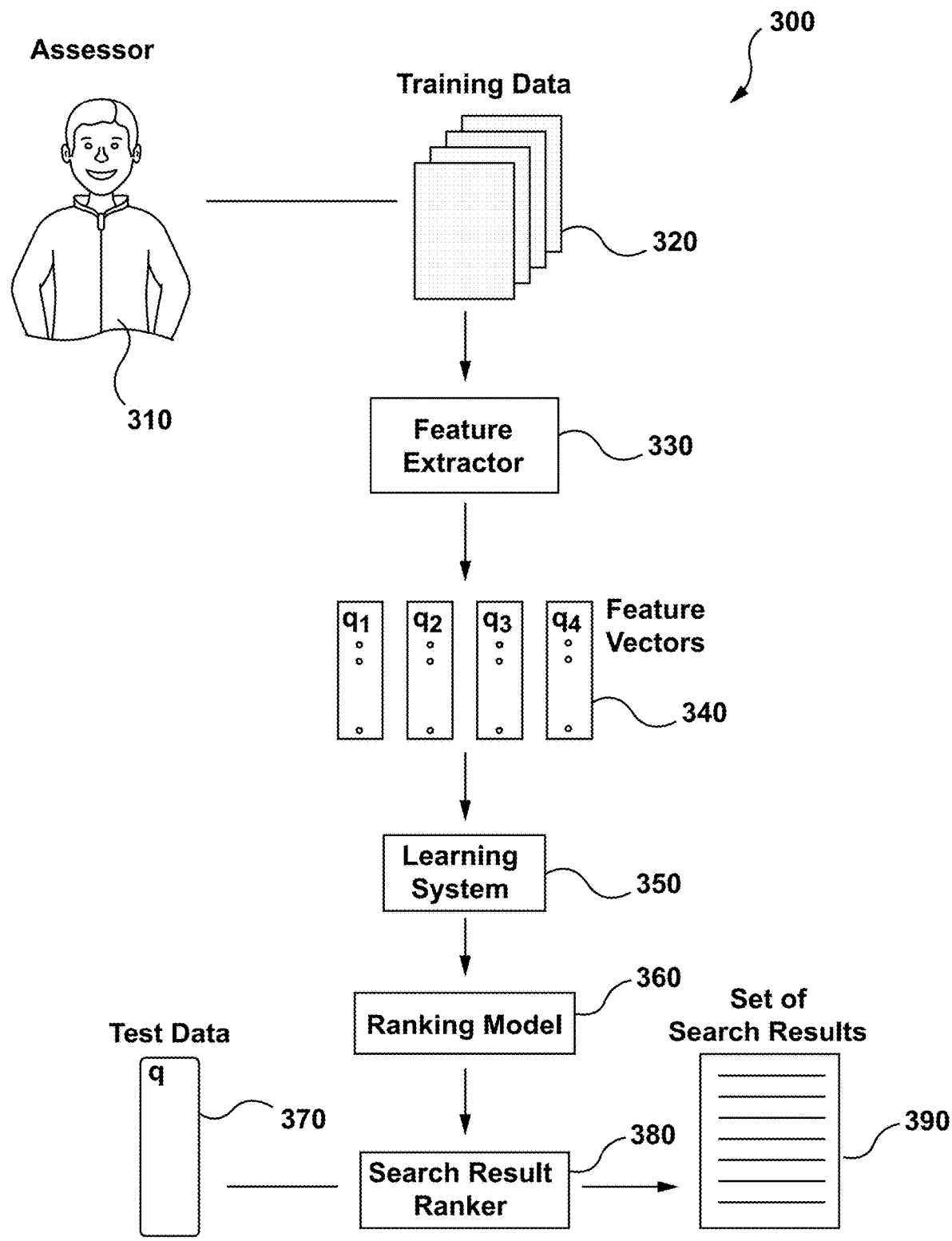
FIG. 3 is an illustration of a machine learned ranking framework implemented in accordance with an embodiment of the present technology.

Now turning to FIG. 3, components of a machine learned ranking framework 300 are illustrated in accordance with an embodiment of the present technology. The machine learned ranking framework 300 generally comprises a feature extractor 330, a learning system 350, a ranking model 360 and a search result ranker 380.

The feature extractor 330, the learning system 350, the ranking model 360 and the search result ranker 380 of the machine learned ranking framework 300 may be referred altogether as the machine learning algorithm of the training server 220 and the search engine server 230.

The feature extractor 330, the learning system 350, the ranking model 360 and the search result ranker 380 of the machine learned ranking framework 300 may be implemented and executed on the training server 220 and the search engine server 230. As should be understood by a person skilled in the art, the feature extractor 330, the learning system 350, the ranking model 360 may be executed on the training server 220 during the training phase, and the ranking model 360 may be sent to be incorporated into the search result ranker 380 for a verification phase and then into a production phase on the search engine server 230. As a non-limiting example, the training server 220 may be a server implementing the feature extractor 330, the learning system 350 and the ranking model 360 and the search engine server 230 may be a search engine server implementing the search result ranker 380. In some embodiments, the machine learned ranking framework 300 may be implemented solely on the training server 220 or solely on the search engine server 230. In other embodiments, the feature extractor 330, the learning system 350, the ranking model 360 of the machine learned ranking framework 300 may all be implemented on different servers (not depicted).

Generally, documents used for training a machine learning algorithm may be assessed or labelled by one or more human assessors. Illustrated herein for ease of convenience is a single assessor 310, but as should be understood by a person skilled in the art, the number of assessors is not limited. The assessor 310 may evaluate the relevance of documents associated with one or more queries, resulting in query-document labelled pairs. As it should be understood, the relevance information or label may be represented in several ways. As a non-limiting example, the assessor 310 may use a decision table provided by the search-engine with different ratings scores for labelling the different websites related to a query, where the websites or documents may be labelled with scores from 0 (irrelevant) to 4 (perfectly relevant). In some embodiments, the assessor 310 may be another machine learning system, were documents may be assessed by a MLA according to pre-impression and post-impression features, as described in a co-owned U.S. Pat. No. 9,501,575 issued Nov. 22, 2016, which is incorporated herein by reference in its entirety. The documents labelled by the assessor 310 may result in the training data 320.

The training data 320 may then go through a feature extractor 330, to output features vectors 340 representing documents in the training data 320. Each feature vector of the feature vectors 340 may be associated with a document and a query. Feature vectors are generally n-dimensional vectors of numerical features representing an object. Features, also known as factors or ranking signals, are generally used for representing query-document pairs in information retrieval systems. Features vectors may generally be query-independent (i.e. static features), query-dependent (i.e. dynamic features) and query level features. Examples of features include TF, TF-IDF, BM25, IDF sums and lengths of document's zones and document's PageRank, HITS ranks or other variants. As a non-limiting example, the features of the feature vectors 340 may comprise: popularity of the document, freshness of the document, number of outgoing links, number of incoming links, and length of the document. Each element of the feature vector may be a real value representing the feature. As should be understood, the size of a feature vector is not limited, and may depend on how the search engine server 230 is implemented. As a non-limiting example, the feature vector 340 for each document associated with a query may be a 136-dimensional vector, comprising, for each one of the body, the anchor, the title, the URL, and the whole document: covered query term number, covered query term ratio, stream length, inverse document frequency (IDF), sum of term frequency, max of term frequency, min of term frequency, mean of term frequency, etc. In some embodiments, the features vectors 340 may be binarized and only take binary values (0 or 1). The feature vectors 340 may then go through the learning system 350.

The learning system 350 may generally be implemented as a machine learning algorithm, taking as an input the feature vectors 340 representing the training data 320 and outputting a ranking model 360. The implementation of the learning system 350 is not limited and is known in the art. The objective of the learning system 350 in the training phase may generally be to create a ranking model 360, which is a function taking as an input the feature vectors 340 of the training data 320, each feature vector of the feature vectors 340 being associated with a document, and assigning a score to each feature vector of the features vectors 340, to match as closely as possible the labels given by the assessor 310. Examples of machine learning systems include LambdaMART by MICROSOFT™, RankBrain by GOOGLE™, and MatrixNET by YANDEX™, among others. The learning system 350 and the ranking model 360 may also be referred together as the MLA of the search engine server 230.

In the validation phase, the ranking model 260 of the search result ranker 380 of the search engine server 230 may have as an input test data 370, to output a set of search results 390. In the validation phase, the ranking model 260 is tested with the input test data 370, and corrected and optimized depending on the set of search results 390 that is obtained. The search result ranker 380 may then use the ranking model 260 to assign relevance scores to not yet assessed documents. The performance of the ranking model 360 may also be evaluated. As it is known to persons skilled in the art, different methods may be used to evaluate the performance of the ranking model, such as, but not limited to, NDCG (Normalized Discounted Cumulative Gain), DCG (Discounted Cumulative Gain), MAP (Mean Average Precision), Kendall's Tau and pfound.

The search result ranker 380 may be continuously retrained by going through the training phase, the validation phase and the production phase after a predetermined period of time. The search result ranker 380 may also be continuously trained by monitoring the feedback of the users, considering personal preferences of the users, selecting different feature vectors, etc. as it is known in the art.

Figure 4:
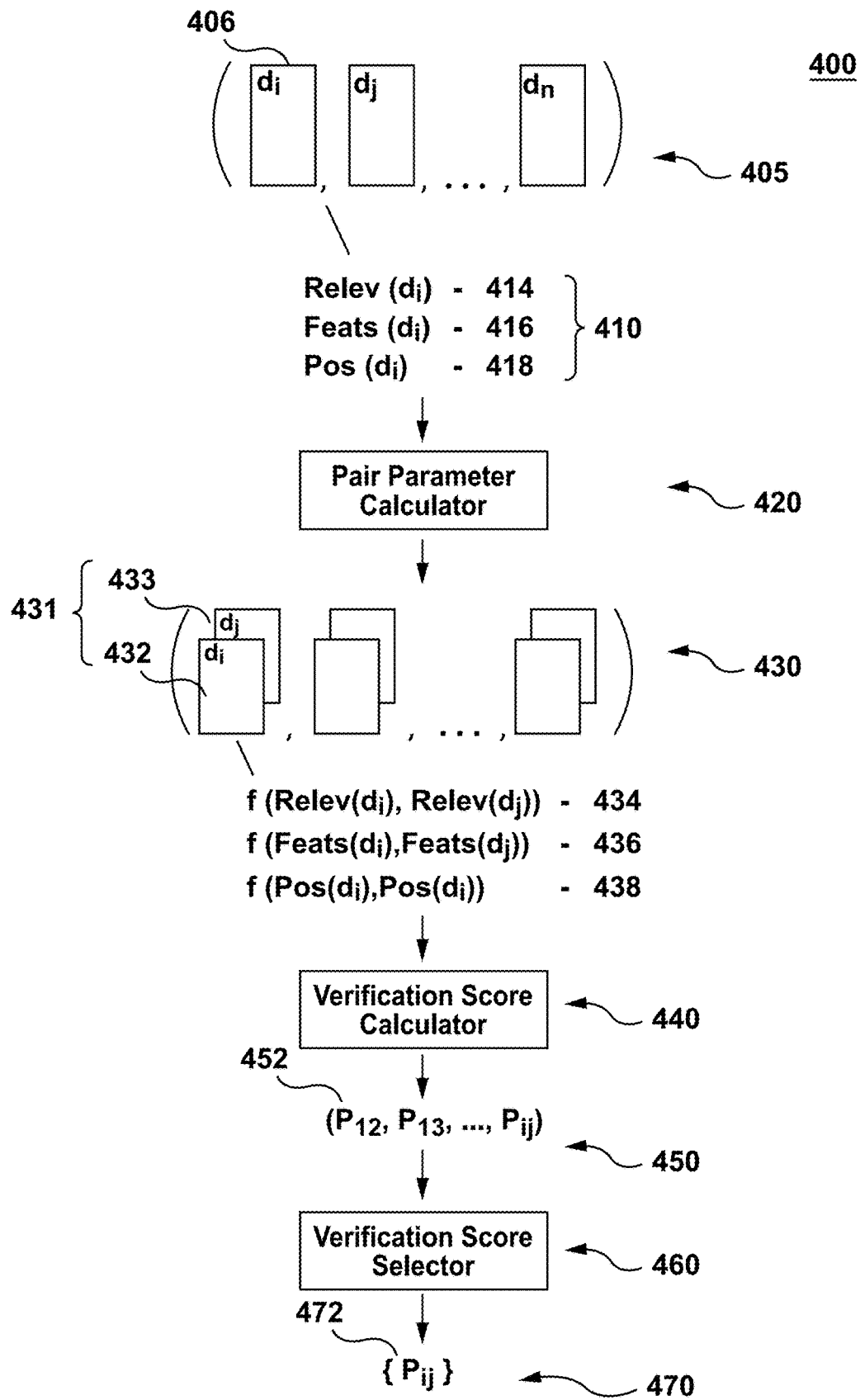
FIG. 4 is an illustration of verification score framework implemented in accordance with an embodiment of the present technology.

Now turning to FIG. 4, verification score framework 400 is illustrated in accordance with an embodiment of the present technology.

The verification score framework 400 comprises a pair parameter calculator 420, a verification score calculator 440 and a verification score selector 460.

The verification score framework 400 may be implemented on the electronic device 100. In other embodiments, the verification score framework 400 comprising the pair parameter calculator 420, the verification score calculator 440 and the verification score selector 460 may be implemented at least in part on the training server 200 and/or on the search engine server 230.

The set of search results 405 may be a set of search results provided by the search engine server 230 in response to a query q. In some embodiments, the set of search results 405 may comprise multiple subsets of search results (not depicted), each subset of search results provided in response to a different query $q_1, q_2, \ldots, q_n$. In other embodiments, the set of search results 405 may only be a subset of all the search results responsive to a query e.g. top 10, top 20, top 30, top 40 or top 50 results. Each document 406 of the set of search results 405 may be associated or have a set of parameters 410, the set of parameters 410 comprising a relevance score 414 generated by the MLA of the search engine server 230, a feature vector 416 generated by the MLA of the search engine server 230 and a position 418 in a search-engine results page (SERP) generated by the search engine server 230. As should be understood, the relevance score 414 may be generated by the MLA of the search engine server 230 based at least in part on the feature vector 416. The position 418 in the SERP may also have been determined based at least in part on the relevance score 414. The set of parameters 410 associated with each document 406 of the set of search results 405 may then go through the pair parameter calculator 420.

The pair parameter calculator 420 may receive as an input the set of parameters 410 associated with each document 406 of the set of search results 405, and may output a set of pair parameters 430. The pair parameter calculator 420 may compute, for each possible pair of documents 431 of the set of search results 405, each possible pair of documents 431 having a first document 432 and a second document 433: a first parameter 434, a second parameter 436 and a third parameter 438. Therefore, the number of pairs of documents may be expressed by the combination equation:

$$n_p = \frac{n!}{k!(n-k)!} \qquad (1)$$

where n is the number of documents in the set of search results 405 and k is 2.

In some alternative embodiments, the first parameter 434, the second parameter 436, the third parameter 438 may only be computed for adjacent documents, i.e. documents that are within a certain range of each other. As an example, the first parameter 434, the second parameter 436, the third parameter 438 may be computed between the first positioned document and the second positioned document, and between the first positioned document and the third positioned document, but not between the first positioned and the fortieth positioned document. In other embodiments, the first parameter 434, the second parameter 436, the third parameter 438 may only be computed for directly adjacent documents, i.e. documents that are directly next to each other. In other embodiments, the first parameter 434, the second parameter 436, the third parameter 438 may be computed for three or more documents instead of a pair of documents.

The first parameter 434 may be obtained by a first binary operation on the relevance scores 414 of the documents of the pair of documents 431, the first parameter 434 indicative of a level of difference in the relevance scores of the first document 432 and the second document 433 of the pair of documents 431.

The second parameter 436 may be obtained by a second binary operation on the feature vectors 416 of the documents of the pair of documents 431, the second parameter 436 indicative of a level of difference in the feature vectors of the first document 432 and the second document 433 of the pair of documents 431.

The first binary operation and the second binary operation may be both subtractions. In some embodiments, the first binary operation and the second binary operation may not necessarily be the same type of operation, and may be an addition, a multiplication or a division. In other embodiments, the first parameter 434 and the second parameter 436 may be obtained by a different type of mathematical operation.

The first parameter 434 and the second parameter 436 are indicative respectively of a difference in positions and a difference in features vectors of the first document 432 and the second document 433 of the pair of documents 431, and any mathematical operation allowing to represent such a difference may be used.

The third parameter 438, may be based on the position 418 of the first document 432 and the second document 433 of the pair of documents 431 in the SERP. The third parameter 438 may be a lowest position of the positions 418 of the first document 432 and the second document 433 of the pair of documents 431. In other embodiments, the third parameter 438 may be the average of the positions 418 of the pair of documents 431. Generally, the third parameter 438 may be an indication of the importance of the pair of documents for the selection i.e. a document that appears higher in the SERP, has a lower position 418 and usually a higher relevance score 414 to the query than documents that have higher positions 418, and therefore errors in ranking in documents that are presented at lower positions on the first few pages of the SERP should be prioritized since the probability of a user clicking on them is greater.

How each possible pair of documents 430 is represented is not limited, and each possible pair of documents 430 may be, as a non-limiting example, implemented as a cell array, one or more vectors, a matrix or set of matrices. Each possible pair of documents 430 may then go through the verification score calculator 440.

The verification score calculator 440 may take each possible pair of documents 430 as an input and output a set of verification scores 450. The verification score calculator 440 may compute a verification score 452 based on the first parameter 434, the second parameter 436 and the third parameter 438 for each possible pair of documents 431 of the set of search results 405. In some embodiments, the verification score 452 may only be based on the first parameter 434 and the second parameter 436.

The first parameter 434 may be weighted by a first coefficient (not depicted), the second parameter 436 may be weighted by a second coefficient (not depicted) and the third parameter 438 may be weighted by a third coefficient (not depicted), the first coefficient, the second coefficient and the third coefficient providing a more accurate indication of the verification score for selecting the at least one possibly erroneously ranked document.

Each one of the first coefficient, the second coefficient and the third coefficient may respectively determine the degree of influence of the first parameter 434, the second parameter 436, and the third parameter 438 in computing the verification score 452. In some embodiments, the first coefficient, the second coefficient and the third coefficient may be determined and adjusted heuristically, where initial values may be given to each one of the first coefficient, the second coefficient and the third coefficient, and the values may be adjusted depending on the results obtained experimentally. In some embodiments, a set of training documents with erroneously ranked documents may be used to train the verification score framework 400 and optimal values for the first coefficient, the second coefficient and the third coefficient may be found.

The verification score 452 is indicative of a level of misalignment between the first document 432 and the second document 433 of the pair of documents 431. In other words, the verification score 452 gives an indication of how distinct or different the first document 432 and the second document 433 of the pair of documents 430 appear to the MLA of the search engine server 230. As an example, the first document 432 and the second document 433 from a pair of documents that are far apart in term of their features vectors 416 (indicating how different the documents actually are) but close in term of their relevance scores 414 (indicating how closely the MLA of the search engine server 230 actually perceives the relevance of the documents to be) may have a verification score 452 reflecting this misalignment.

Similarly, the first document 432 and the second document 433 from a pair of documents that are far apart in term of their relevance scores 414 (indicating how far apart the MLA of the search engine server 230 actually perceives the relevance of the documents to be) but close in term of their features vectors 416 (indicating how similar the documents actually are) may have a verification score 452 reflecting this misalignment.

Therefore, the verification score 452 may allow detecting inconsistencies and errors in ranking of the documents by the MLA of the search engine server 230, i.e. documents that have been ranked close to each other but are substantially dissimilar, or documents that are substantially similar but have been ranked far from each other in the search results.

Such situations may be reflected directly in the verification score 452, where the first parameter 434, indicative of a level of difference in the relevance scores 414 of the first document 432 and the second document 433 of the pair of documents 431, may be high, and the second parameter 436, indicative of a level of difference in the feature vectors 404 may be low, resulting in an extreme verification score 472. Similarly, if the first parameter 434, indicative of a level of difference in the relevance scores 414 of the first document 432 and the second document 433 of the pair of documents 431 is low, and the second parameter 436, indicative of a level of difference in the feature vectors 404 is high, it may result in an extreme verification score 472. A high first parameter may therefore be indicative of a high level of difference in the relevance scores of the first document and the second document, and a low first parameter may be indicative of a low level of difference in the relevance scores of the first document and the second document. The high second parameter may be indicative of a high level of difference in the feature vectors of the first document and the second document, and the low second parameter is indicative of a low level of difference in the feature vectors of the first document and the second document.

The extreme verification score 472 may therefore indicate the inability of the MLA of the search engine server 230 to distinguish the first document 432 and the second document 433 of the pair of documents 431, because of their respective feature vectors 404 and their respective relevance scores 414.

In some embodiments, each verification score 452 of the set of verification scores 450 may be computed based on the equation:

$$P_q(d_1, d_2) = \alpha^{min(Pos(d_1), Pos(d_2))} \cdot \frac{|Relev(d_1) - Relev(d_2)|^\beta}{\|Feats(d_1) - Feats(d_2)\|_2^\gamma} \quad (2)$$

where:
$P_q(d_1,d_2)$ is the verification score 452 of the pair of documents 431;
$d_1$ is the first document of the pair of documents;
$d_2$ is the second document of the pair of documents;
$Relev(d_1)-Relev(d_2)$ is the first parameter 434;
$Feats(d_1)-Feats(d_2)$ is the second parameter 436;
$min(Pos(d_1),Pos(d_2))$ is the third parameter 438;
$\beta$ is the first coefficient;
$\gamma$ is the second coefficient; and
$\alpha$ is the third coefficient.

As stated previously, the value of the coefficients $\alpha$, $\beta$, and $\gamma$ may be determined heuristically. Generally, $\alpha>1$, $\beta>0$ and γ>0. Experimentally, it has been found that optimal values for each of the coefficients are the following: 1.56≤α≤1.58, β=0.55, γ=2.0. However, other values are possible, depending on how the set of parameters 410 is implemented.

The set of verification scores 450 may then go through the verification score selector 460.

The verification score selector 460 may take as an input the set of verification scores 450 to output the set of marked verification scores 470. Generally, the objective of the verification score selector 460 is to select at least one pair of documents 431 associated with an extreme verification score 472 in the set of verification scores 450. As explained previously, a pair of documents 431 associated with an extreme verification score 472 may be indicative of a high level of misalignment between the relevance scores of the pair of documents 431 and the feature vectors of the pair of documents 431, the high level of misalignment indicative of a possibly erroneously ranked document in the pair of documents 431.

How the verification score selector 460 is implemented is not limited. In some embodiments, the verification score selector 460 may only select one document in the set of verification scores 450 associated with an extreme (lowest or highest) verification score. In other embodiments, the verification score selector 460 may first rank the verification scores 452 of the set of verification scores 450 in a descending order, and select a subset of verification scores 452 of the set of verification scores 450 that are under a predetermined threshold.

In some embodiments, the verification score selector 460 may compare each verification score 452 in the set of verification scores 450 with a predetermined threshold value, and select the verification scores that are under the predetermined threshold. The predetermined threshold may be determined experimentally i.e. it may be determined that pair of documents that are usually erroneously ranked are under a certain value of verification score, and the threshold may be determined based on that value of verification score.

In other embodiments, there may be two predetermined thresholds, a first predetermined threshold for the first parameter 434 and a second predetermined threshold for the second parameter 436, and the combination of the first and the second predetermined thresholds may indicate documents to select. As it may be understood, the way the verification score selector 460 is implemented depends on how the verification score 452 is computed.

The selected document associated with an extreme verification score 472 may then be marked and sent for analysis to the search engine server 230. A document in the pair of documents 431 associated with an extreme verification score 472 may have been erroneously ranked by the MLA of the search engine server 230 for a variety of reasons: some features were not representative of the documents, the MLA overemphasized some features over other features, more features should have been considered, etc.

Identifying the pair of documents 431 having an extreme verification score 472 may allow analyzing the documents of the pair of documents 431 to find errors in the MLA ranking algorithm, and may therefore allow to adjust and improve the MLA of the search engine server 230 by retraining the MLA without needing more training samples. The documents of the pair of documents 431 may be re-evaluated by assessors, and reused to train the MLA.

Figure 5:
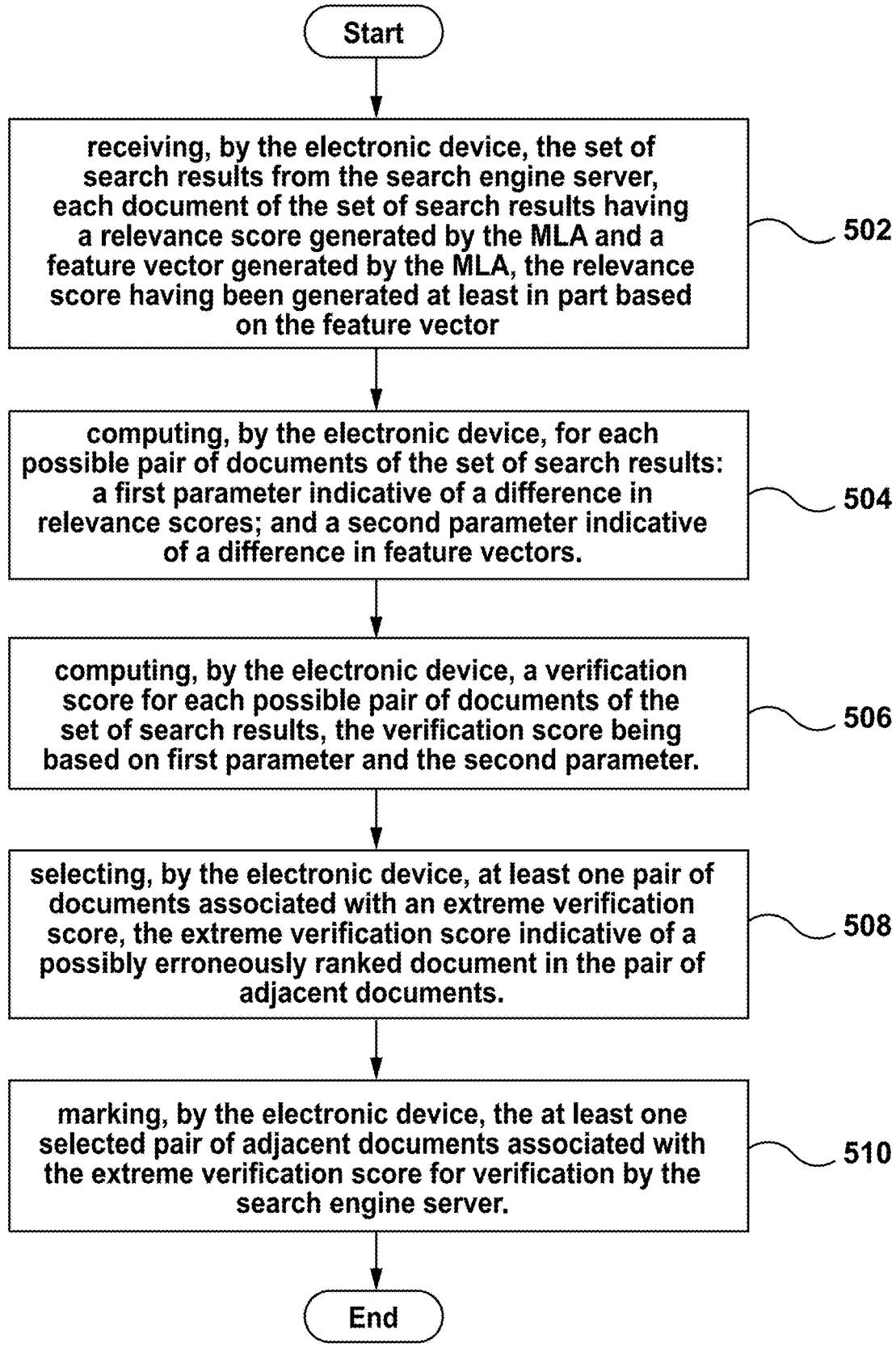
FIG. 5 is a flow-chart illustration of a method carried out by an electronic device for selecting potentially erroneously ranked documents implemented in accordance with non-limiting embodiments of the present technology.

Now turning to FIG. 5, a method 500 for selecting potentially erroneously ranked documents is illustrated in the form of a flowchart in accordance with an embodiment of the present technology. The method may start at step 502.

The method 500 may be executed on the electronic device 100, implemented as a verification server.

STEP 502: receiving, by the electronic device, the set of search results from the search engine server, each document of the set of search results having a relevance score generated by the MLA and a feature vector generated by the MLA, the relevance score having been generated at least in part based on the feature vector At a step 502, the electronic device 100 may receive the set of search results 405 from the search engine server 230, each document 406 of the set of search results 405 being associated with a query, each document 406 having a relevance score 414 generated by the MLA of the search engine server 230 and a feature vector 416 generated by the MLA of the search engine server 230, the relevance score 414 having been generated at least in part based on the feature vector 416.

In some embodiments, each document 406 of the set of search results 405 may further have a position 418, the position 418 having been generated at least in part based on the relevance score 414. In other embodiments, the set of search results 405 may be have a plurality of subsets of search results, each subset of search results responsive to a respective query q. In the non-limiting example illustrated herein, the set of search results 405 may have only the top 30 documents d1, d2, d3, . . . , d30 responsive to a query q, as documents displayed on the first few pages of the SERP are the most likely to get selected by a user typing a query. The method 500 may then advance to step 504.

STEP 504: computing, by the electronic device, for each possible pair of documents of the set of search results: a first parameter indicative of a difference in relevance scores; and a second parameter indicative of a difference in feature vectors.

At step 504, the electronic device 100 executing the pair parameter calculator 420 may compute, for each possible pair of documents 430 of the set of search results 405, a first parameter 434 indicative of a difference in relevance scores 414 of the first document 432 and the second document 433 and a second parameter 436 indicative of a difference in feature vectors 340 of the first document 432 and the second document 433.

In some embodiments, the electronic device 100 executing the pair parameter calculator 420 may further compute a third parameter 438, the third parameter 438 based on the positions 418 of the first document 432 and the second document 433 of the pair of documents 431. In the non-limiting example illustrated herein, with the set of search results 405 containing the top 30 documents, the pair parameter calculator 420 must compute the first parameter 434, the second parameter 436 and the third parameter 438 for each possible pair of documents in a set of 30 documents, resulting in 435 possible pairs of documents. The third parameter 438 may be a minimum between the positions 418 of the first document 432 and the second document 433 of the pair of documents.

In the non-limiting example illustrated herein, the first parameter 434 may be calculated by subtracting the value of the relevance score 414 of the first document 432 of the pair of documents 431 with the relevance score 414 of the second document 433 of the pair of documents 431 and taking the absolute value, which may be equal to 17. The second parameter 436 may then be computed by subtracting the feature vector 416 of the first document 432 of the pair of documents 431 with the feature vector 416 of the second document 433 of the pair of documents 431 and taking the norm of the difference, which may be equal to 4.71. The third parameter 438 may be determined by taking the minimal position between the first document 432 and the second document 433 of the pair of documents 431, having a position of 3, and the second document of the pair of documents 431 having a position of 7, the minimal position may be equal to 3. The method 500 may then advance to step 506.

STEP 506: computing, by the electronic device 100, a verification score for each possible pair of documents of the set of search results, the verification score being based on first parameter and the second parameter At step 506, the electronic device 100 executing the verification score calculator 440 may compute a verification score 452 for each possible pair of documents 430 of the set of search results 405, the verification score 452 being based on first parameter 434 and the second parameter 436. The verification score 452 may further comprise the third parameter 438. Continuing with the preceding example, having the minimal position of 3, the difference in relevance scores of 17 and the norm of the difference of the features vector being 4.71, the verification score may be computed with equation (2) presented previously:

$$P_q(d_1, d_2) = 1.57^{min(3,7)} \frac{|17|^{0.55}}{\|4.71\|_2^2} = 0.828712805$$

The method 500 may then advance to step 508.

STEP 508: selecting, by the electronic device, at least one pair of documents associated with an extreme verification score, the extreme verification score indicative of a possibly erroneously ranked document in the pair of adjacent documents At a step 508, the electronic device 100 executing the verification score selector 460 may select at least one pair of documents 431 associated with an extreme verification score 472, the extreme verification score 472 indicative of a possibly erroneously ranked document in the pair of documents 431. The electronic device 100 executing the verification score selector 460 may select the lowest verification score of the verification scores of each possible pair of documents 430. As stated previously, how the verification score selector 460 selects the at least one pair of documents 431 associated with an extreme verification score 472 is not limited. The method 500 may then advance to step 510.

STEP 510: marking, by the electronic device, the at least one selected pair of adjacent documents associated with the extreme verification score for verification by the search engine server At a step 510, the electronic device 100 executing the verification score selector 460 may mark the at least one selected pair of documents associated with an extreme verification score 472 for verification by the search engine server 230. The first document and/or the second document of the marked pair of documents may have been erroneously ranked, for the reasons explained above.

Steps 502-510 may then be repeated for a plurality of sets of search results (not depicted), each sets of search results associated with a respective query, where the extreme verification score 472 for each query may be ranked in a priority queue for re-scoring the documents of the pair of documents 431 and/or for verification by an assessor or a developer. The pair of documents 431 having the highest or lowest value of the extreme verification score 472 may be selected for re-scoring and training the MLA of the search engine server 230.

The method 500 may then end.

Within the present description it should be understood that in any case where retrieving data from any client device and/or from any mail server is mentioned, retrieving an electronic or other signal from corresponding client device (a server, a mail server) can be used, and displaying on a screen of the device can be implemented as transmitting a signal to the screen, the signal includes specific information which further can be interpreted with specific images and at least partially displayed on the screen of the client device. Sending and receiving the signal is not mentioned in some cases within the present description to simplify the description and as an aid to understanding. Signals can be transmitted using optical methods (for example, using fiber-optic communication), electronic methods (wired or wireless communication), mechanic methods (transmitting pressure, temperature and/or other physical parameters by the means of which transmitting a signal is possible.

The invention claimed is:

1. A computer-implemented method for selecting a potentially erroneously ranked document in a set of search results, the set of search results having been generated by a search engine server executing a machine learning algorithm (MLA) responsive to a query, the method executable by an electronic device, the electronic device connected to the search engine server, the method comprising:
  receiving, by the electronic device, the set of search results from the search engine server, each document of the set of search results having a relevance score generated by the MLA and a feature vector generated by the MLA, the relevance score having been generated at least in part based on the feature vector;
  computing, by the electronic device, for each possible pair of documents of the set of search results, the pair of documents comprising a first document and a second document:
    a first parameter obtained by a first binary operation on the relevance scores of the first document and the second document, the first parameter indicative of a level of difference in the relevance scores of the first document and the second document, and
    a second parameter obtained by a second binary operation on the feature vectors of the first document and the second document, the second parameter indicative of a level of difference in the feature vectors of the first document and the second document;
  computing, by the electronic device, a verification score for each possible pair of documents of the set of search results, the verification score being based on first parameter and the second parameter, the verification score indicative of a level of misalignment between the relevance scores of the first document and the second document and the feature vectors of the first document and the second document of the pair of documents;
  selecting, by the electronic device, at least one pair of documents associated with an extreme verification score, the extreme verification score indicative of a high level of misalignment between the relevance scores of the first document and the second document and the feature vectors of the first document and the second document of the pair of documents, the high level of misalignment indicative of a possibly erroneously ranked document in the pair of documents; and
  marking, by the electronic device, the at least one selected pair of documents associated with the extreme verification score for verification by the search engine server.

2. The method of claim 1, wherein the extreme verification score is further indicative of an inability of the MLA of the search engine server to distinguish the first document and the second document of the pair of documents.

3. The method of claim 2, wherein the verification score increases for pairs of document having a high first parameter and a low second parameter, and wherein the verification score decreases for pairs of documents having a low first parameter and a high second parameter.

4. The method of claim 3, wherein the high first parameter is indicative of a high level of difference in the relevance scores of the first document and the second document, and wherein the low first parameter is indicative of a low level of difference in the relevance scores of the first document and the second document.

5. The method of claim 4, wherein the high second parameter is indicative of a high level of difference in the feature vectors of the first document and the second document, and wherein the low second parameter is indicative of a low level of difference in the feature vectors of the first document and the second document.

6. The method of claim 5, wherein each document of the set of search results has a position in a search engine results page (SERP), the position having been determined at least in part based on the relevance score, and wherein the verification score is further based on a third parameter, the third parameter being based on the positions in the SERP of the first document and the second document of the pair of documents.

7. The method of claim 6, wherein the first binary operation is a subtraction and the second binary operation is a subtraction.

8. The method of claim 7, wherein the third parameter is a lowest position between the position of the first document of the pair and the second document of the pair.

9. The method of claim 8, wherein the extreme verification score is a lowest verification score.

10. The method of claim 9, wherein the selecting the at least one pair associated with the lowest verification score comprises selecting a subset of verification scores, each verification score of the subset of verification scores being under a predetermined threshold, the predetermined threshold indicative of an erroneously ranked document.

11. The method of claim 10, wherein the first parameter is weighted by a first coefficient, the second parameter is weighted by a second coefficient and the third parameter is weighted by a third coefficient, the first coefficient, the second coefficient and the third coefficient allowing to reflect a degree of influence of the first parameter, the second parameter and the third parameter in the verification score for selecting the at least one possibly erroneously ranked document.

12. The method of claim 11, wherein the first coefficient, the second coefficient and the third coefficient have been determined heuristically.

13. The method of claim 12, wherein the computing for each pair of adjacent document is performed for a subset of the set of search results.

14. The method of claim 13, further comprising:
transmitting the at least one pair of documents to the search engine server; and
repeating the steps of: receiving the set of search results, computing the first parameter, the second parameter and the third parameter, computing the verification score, the selecting the at least one pair associated with the lowest verification score and the marking the at least one pair after a predetermined period of time.

15. The method of claim 14, wherein the verification score is computed based on:

$$P_q(d_1, d_2) = \alpha^{min(Pos(d_1),Pos(d_2))} \cdot \frac{|Relev(d_1) - Relev(d_2)|^\beta}{\|Feats(d_1) - Feats(d_2)\|_2^\gamma}$$

where
$P_q(d_1,d_2)$ is the verification score of the pair of documents;
$d_1$ is the first document of the pair of documents;
$d_2$ is the second document of the pair of documents;
$Relev(d_1)-Relev(d_2)$ is the first parameter;
$Feats(d_1)-Feats(d_2)$ is the second parameter;
$min(Pos(d_1),Pos(d_2))$ is the third parameter;
$\beta$ is the first coefficient;
$\gamma$ is the second coefficient; and
$\alpha$ is the third coefficient.

16. A system for selecting a potentially erroneously ranked document in a set of search results, the set of search results having been generated by a search engine server executing a machine learning algorithm (MLA) responsive to a query, the system connected to the search engine server, the system comprising:
a processor;
a non-transitory computer-readable medium comprising instructions;
the processor, upon executing the instructions, being configured to execute:
receiving the set of search results from the search engine server, each document of the set of search results having a relevance score generated by the MLA and a feature vector generated by the MLA, the relevance score having been generated at least in part based on the feature vector;
computing for each possible pair of documents of the set of search results, the pair of documents comprising a first document and a second document:
a first parameter obtained by a first binary operation on the relevance scores of the first document and the second document, the first parameter indicative of a level of difference in the relevance scores of the first document and the second document, and
a second parameter obtained by a second binary operation on the feature vectors of the first document and the second document, the second parameter indicative of a level of difference in the feature vectors of the first document and the second document;
computing a verification score for each possible pair of documents of the set of search results, the verification score being based on first parameter and the second parameter, the verification score indicative of a level of misalignment between the relevance scores of the first document and the second document and the feature vectors of the first document and the second document of the pair of documents;
selecting at least one pair of documents associated with an extreme verification score, the extreme verification score indicative of a high level of misalignment between the relevance scores of the first document and the second document and the feature vectors of the first document and the second document of the pair of documents, the high level of misalignment indicative of a possibly erroneously ranked document in the pair of documents; and marking the at least one selected pair of documents associated with the extreme verification score for verification by the search engine server.

17. The system of claim 16, wherein the extreme verification score is further indicative of an inability of the MLA of the search engine server to distinguish the first document and the second document of the pair of documents.

18. The system of claim 17, wherein the verification score increases for pairs of document having a high first parameter and a low second parameter, and wherein the verification score decreases for pairs of documents having a low first parameter and a high second parameter.

19. The system of claim 18, wherein the high first parameter is indicative of a high level of difference in the relevance scores of the first document and the second document, and wherein the low first parameter is indicative of a low level of difference in the relevance scores of the first document and the second document.

20. The system of claim 19, wherein the high second parameter is indicative of a high level of difference in the feature vectors of the first document and the second document, and wherein the low second parameter is indicative of a low level of difference in the feature vectors of the first document and the second document.

* * * * *